March 17, 1936.  E. H. KREMER  2,034,475
BELT CONNECTER
Filed May 13, 1935   2 Sheets-Sheet 1
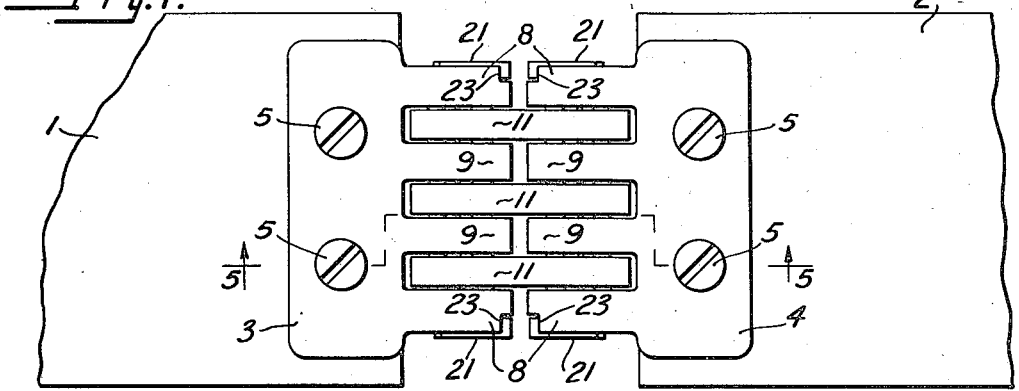
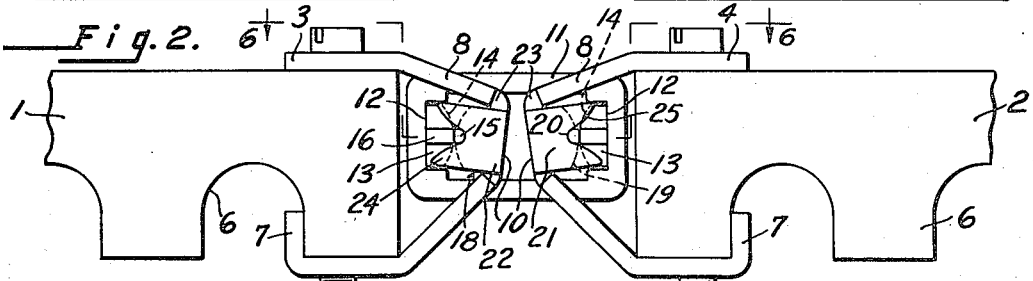
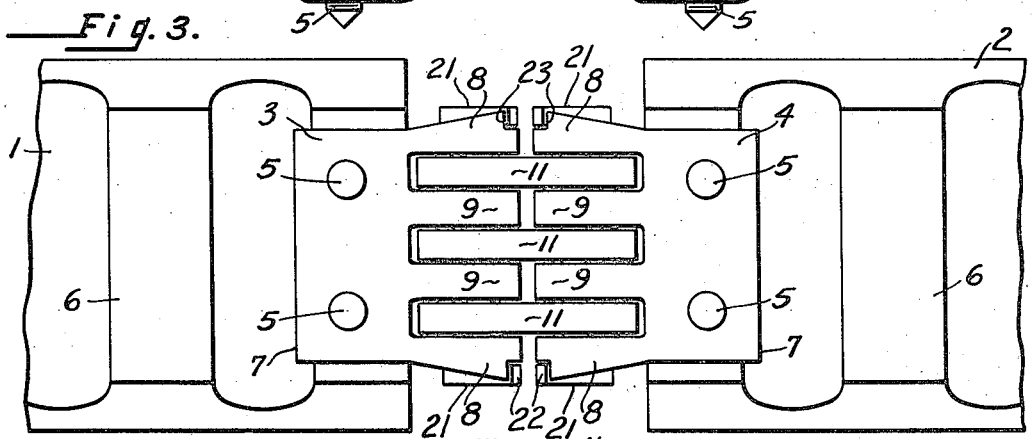
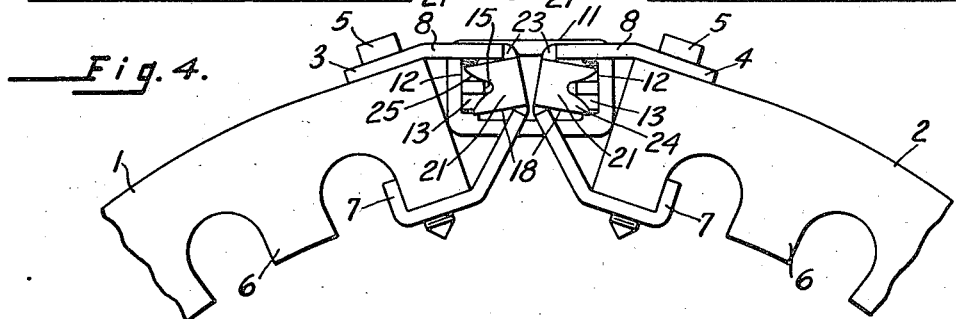
INVENTOR
EDWARD H. KREMER.
BY
Toulmin + Toulmin
ATTORNEYS March 17, 1936.  E. H. KREMER  2,034,475
BELT CONNECTER
Filed May 13, 1935  2 Sheets-Sheet 2

INVENTOR
EDWARD H. KREMER.
BY Toulmin + Toulmin
ATTORNEYS

Patented Mar. 17, 1936

2,034,475

UNITED STATES PATENT OFFICE 2,034,475

BELT CONNECTER

Edward H. Kremer, Dayton, Ohio, assignor to The Dayton Rubber Mfg. Company, Dayton, Ohio, a corporation of Ohio Application May 13, 1935, Serial No. 21,215

23 Claims. (Cl. 24—33)

This invention relates to belt connecting devices, and in particular, to belt connecters having pintle members.

One object of this invention is to provide a belt connecter with double pintle members having additional connecting means arranged to interconnect the pintle members.

Another object is to provide a belt connecter having clamping members interconnected by a connecting link and a pintle assembly, arranged between each clamping member and the connecting link, this belt connecter being especially useful in its application to laminated belts of rubber and fabric construction.

Another object is to provide a belt connecter consisting of a pair of clamping members spaced apart from one another, a connecting link interconnecting the clamping members and a pintle assembly between each clamping member and one side of the connecting link; and also to provide the additional feature of a lateral clearance between the connecting link and the clamping members so as to facilitate a slight amount of transverse angling of the axis of one belt relative to the other, this latter feature being useful in connection with driving belts for mechanisms whose shafts are liable to depart from parallelism during the conditions of operation, such as in the case of railroad car generators driven from the axles.

In the drawings:

Figure 1 is a top plan view of the belt connecter of my invention, of the type having multiple tongues upon the clamping members and multiple connecting links.

Figure 2 is a side elevation of the belt connecter shown in Figure 1.

Figure 3 is a bottom plan view of the belt connecter shown in Figure 1.

Figure 4 is a view similar to Figure 2, but showing the belt connecter with the different portions of the belt angled relatively to one another, such as passing over a pulley of small diameter.

Figure 5:
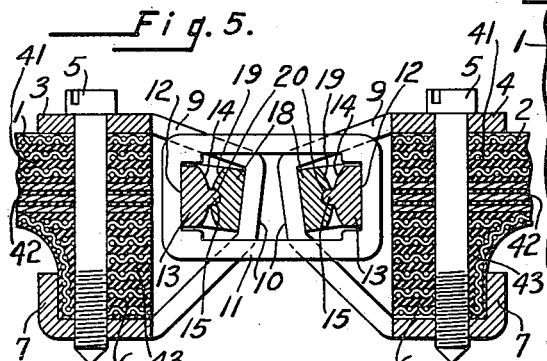
Figure 5 is a vertical, longitudinal section through the belt connecter shown in Figure 1, taken along the line 5—5 thereof.
Figure 6:
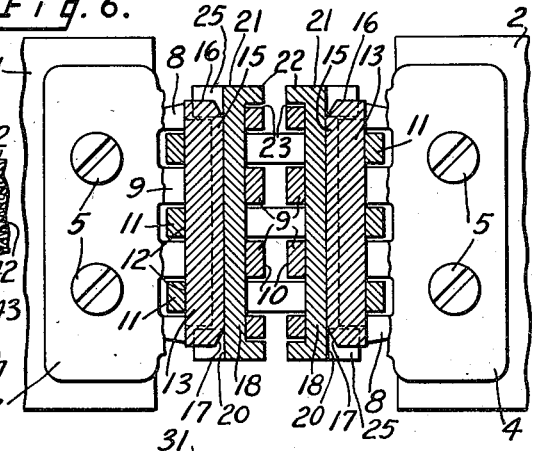
Figure 6 is a horizontal section taken along the line 6—6 of Figure 2.

Referring to the drawings in detail, Figure 1 shows the opposite ends 1 and 2 of a belt to which are attached the clamping members 3 and 4, respectively, as by the clamping screws 5. The belt, of which the ends 1 and 2 are shown, consists preferably of a laminated form having combined layers of rubber and fabric, with toothed portions 6 upon the under side thereof to increase the flexing power and enable the belt to adjust itself more easily to pulleys of small diameter. The clamping members 3 and 4 have substantially parallel upper and lower portions which engage the upper and lower faces of the belt, the ends of the lower sections being angled, as at 7, to engage the toothed portions 6.

The outer tongues 8 and the inner tongues 9 of the clamping members 3 and 4 are of truncated V-shaped outline (Figure 2), having their upper and lower portions angled inwardly toward the axis of the belt, the ends being connected by straight portions 10. The tongues 8 and 9 are interlaced with connecting links 11, arranged to fit between the adjacent tongues (Figure 1). These links in the form shown are of approximately rectangular shape, and on their opposite vertical sides are provided with recesses 12 (Figure 5). These recesses serve the purpose of engaging the flat backs of pintle members, generally designated 13, and preventing the pintle members thus engaged from shifting vertically.

Figure 11:
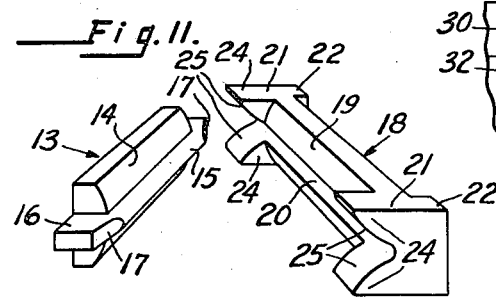
Figure 11 is a perspective view of the pintle members employed in the belt connecter of my invention, these being separated for clearness of showing.

The pintle members 13 are provided with convex faces 14 of arcuate cross section, along which extends a rounded ridge 15 having end extensions 16 beveled off somewhat, as at 17 (Figure 11). Engaged by each of these pintle members 13 is a pintle member, generally designated 18, having a convex face 19 of arcuate cross section, this face 19 having a groove 20 therein corresponding to the ridge 15, which it is adapted to receive. The pintle member 18 is provided with heads 21, having backwardly extending portions 22 adapted to engage recessed portions 23 (Figures 2 and 3), whereby the pintle members in assembly are prevented from moving in an endwise direction.

The pintle member 18 is also provided with forwardly extending portions or wings 24 with their inner surfaces 25 disposed approximately in a V-shaped arrangement to permit free rocking of the ridge 15 and the end extensions 16 in the groove 20 (Figure 11). The ends of the ridge 15 are cut away, as at 17, to permit engagement only along the central portions of the ridge.

Figure 7:
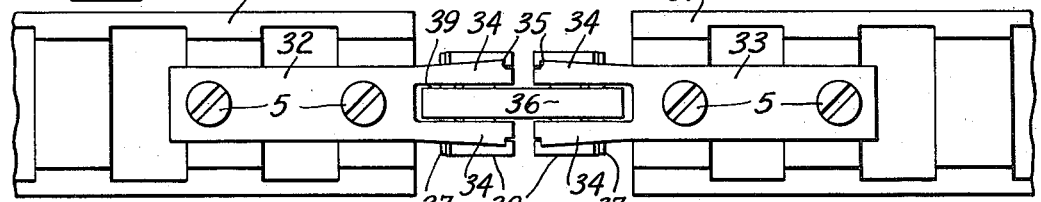
Figure 7 is a top plan view of a modified form of belt connecter having pintle assemblies similar to those shown in Figures 1 to 6, inclusive, but with a single connecting link.
Figure 8:
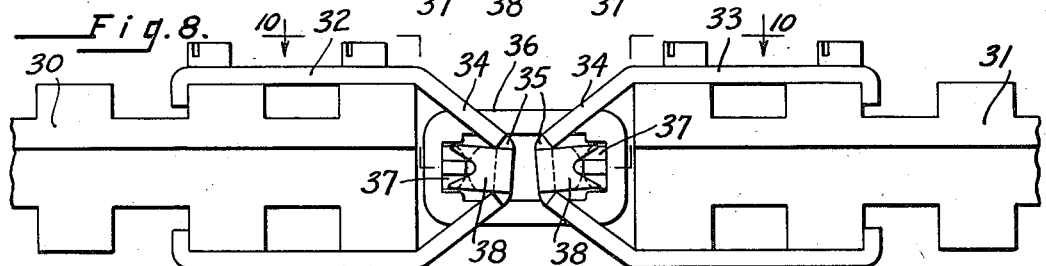
Figure 8 is a side elevation of the belt connecter shown in Figure 7.
Figure 9:
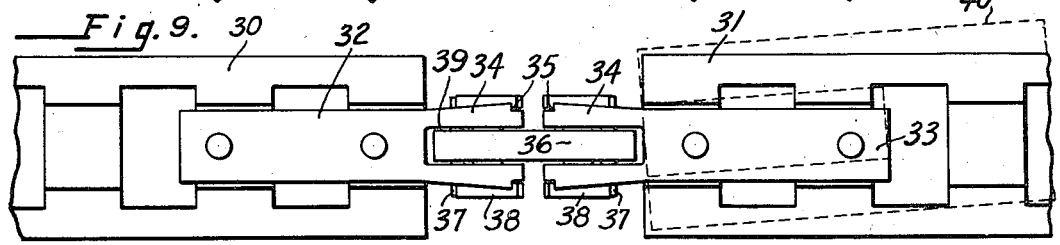
Figure 9 is a bottom plan view of the belt connecter shown in Figure 7.
Figure 10:
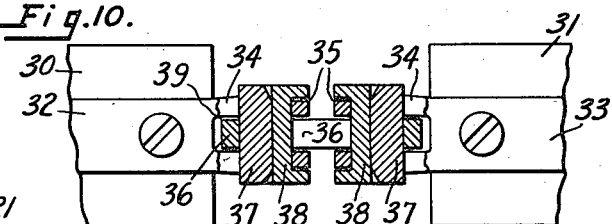
Figure 10 is a horizontal section through the belt connecter shown in Figures 7 to 9, taken along the line 10—10 of Figure 8.

The belt connecter shown in Figures 7 to 9, inclusive, is similar in principle to that shown in Figures 1 to 3, but employs a single connecting link. The ends 30 and 31 of the belt which is here shown to be of hexagonal cross section, are connected by the clamping members 32 and 33, having inwardly angled tongues 34 with recesses 35 for receiving the portions 22 of the pintle member 18, as previously described. Between the tongues 34 and separated therefrom by a clearance (Figure 7) is a connecting link 36. The link 36 is similar in form and arrangement to the links 11 in Figure 1, and a longitudinal section would be substantially identical with the longitudinal section shown in Figure 5.

The opposite pintle members, generally designated 37 and 38, are substantially identical with the pintle members 13 and 18, previously described, but are obviously shorter because of the lesser width of the belt connecter. The pintle members 37 and 38 of the belt connecter shown in Figures 7 to 10, inclusive, likewise operate in a similar manner to the pintle members 13 and 18 of Figures 1 to 6. A further description thereof appears unnecessary for this reason.

In the operation of the belt connecter of my invention, when the belt passes around a pulley the clamping members 3 and 4 or 32 and 33, as the case may be, will be angled relatively to one another, as shown in Figure 4. Under these circumstances the pintle members 18 or 38 will be angled relatively to one another, whereas their corresponding pintle members 13 or 37 will rock therein, with the ridges 15 engaging the grooves 20. The wings 24 will prevent end motion of the pintle member 13 or 37. The end extensions 22 will prevent end motion of the pintle member 18 or 38, and likewise transverse motion of the latter in the connecting links 11 or 36. The angled surfaces 25 of the wings 24 will permit the rocking of the end extensions 16, and the cut-away portion 17 will limit the rocking engagement of the ridge 15 to that portion of the groove 20 which lies between the opposite heads 21.

In the form of connecter shown in Figures 7 to 10 the clearance 39 provided between the tongues 34 and the link 36 is of a sufficient degree to permit a slight lateral angling of the belt end 31 relatively to the belt end 30, as shown in dotted lines 40 in Figure 9. This feature is valuable in providing a certain transverse self-adjustment when the axes of the driving and driven shafts depart from parallelism. An ordinary belt under such circumstances will cramp and a heavy strain will be placed upon the belt connecter. Such strain occurs, for example, when a car having a car lighting generator turns a corner. The shaft of the generator becomes somewhat out of parallelism with the axis of the truck axle, and this maladjustment will be compensated for by the clearance 39 between the tongues 34 and the links 36.

The belt preferably employed with the connecter of this invention consists, in its preferred form, of a laminated structure having combined layers of rubber and fabric with toothed portions 6 upon the under side of the belt. The belt roughly comprises three sections, the tension portion 41, a neutral axis portion 42 and a compression portion 43.

The tension portion 41 is placed at the outer side of the belt and the compression portion 43 at the inner side, with the toothed portions 6 projecting therefrom. The neutral axis portion 42, arranged between the tension portion 41 and the compression portion 43, consists of a plurality of strong inextensible cords impregnated in the rubber with or without suitable fabric. This neutral axis portion 42 is the portion of the belt which remains comparatively unchangeable in length as the belt passes around pulleys, whereas the tension portion 41 is arranged to elongate somewhat and the compression portion 43 to become compressed by a corresponding amount. By placing the fulcrum point of the belt connecter substantially opposite the neutral axis portion 42 and approximately on the same level thereof, the rocking action of the belt connecter is caused to take place on this neutral axis. This results in an improved performance of the belt together with increased efficiency, due to the absence of leverage or relative motion between the neutral axis layer and the fulcrum point.

It will be understood that I desire to comprehend within this invention such modifications as come within the scope of the claims and the invention.

Having thus fully described my invention, what I claim as new and desire to secure by Letters Patent, is:

1. In a belt connecter, a pair of clamping members having tongues, a link arranged between said tongues, and a pintle assembly between each clamping member and the portion of the link adjacent thereto, each of said pintle assemblies comprising a grooved member engaging the tongues of one clamping member and a ribbed member engaging one end of said link and cooperating with said grooved member to provide pivotal connection between said link and said tongues.

2. In a belt connecter, a pair of clamping members having tongues, a link arranged between said tongues, and a pintle assembly between each clamping member and the portion of the link adjacent thereto, said link portion being recessed to receive one part of said pintle assembly, said pintle members being disposed between the ends of said belt.

3. In a belt connecter, a pair of clamping members having tongues, a link arranged between said tongues, and a pintle assembly between each clamping member and the portion of the link adjacent thereto, each of said pintle assemblies being composed of relatively rocking pintle members disposed between the ends of said belt.

4. In a belt connecter, a pair of clamping members having tongues, a link arranged between said tongues, and a pintle assembly between each clamping member and the portion of the link adjacent thereto, each of said pintle assemblies being composed of relatively rocking pintle members disposed between the belt ends and having interengaging projections and depressions adapted to form a fulcrum between said clamping members and said link.

5. In a belt connecter, a pair of clamping members having tongues, a link arranged between said tongues, and a pintle assembly between each clamping member and the portion of the link adjacent thereto, the outermost tongues being recessed to engage one part of said pintle assembly, each of said pintle assemblies being disposed between the belt ends.

6. In a belt connecter, a pair of clamping members having tongues, a link arranged between said tongues, and a pintle assembly between each clamping member and the portion of the link adjacent thereto, each of said pintle assemblies being composed of relatively rocking pintle members and being disposed between the belt ends, the outermost tongues being recessed to engage one part of said pintle assembly.

7. In a belt connecter, a pair of clamping members having tongues, a link arranged between said tongues, and a pintle assembly between each clamping member and the portion of the link adjacent thereto, said link portion being recessed to receive one part of said pintle assembly and the outermost tongues being recessed to receive the other part of said pintle assembly, said pintle assemblies being disposed between the ends of the belt.

8. In a belt connecter, a pair of clamping members having tongues, a link arranged between said tongues, and a pintle assembly between each clamping member and the portion of the link adjacent thereto, each of said pintle assemblies being disposed between the ends of the belt and being composed of relatively rocking pintle members, said link portion being recessed to receive one part of said pintle assembly and the outermost tongues being recessed to receive the other part of said pintle assembly.

9. In a belt connecter, a pair of clamping members having tongues, a link arranged between said tongues and lying wholly between the belt ends, and a pintle assembly between each clamping member and the portion of the link adjacent thereto, said tongues and said link having a lateral clearance between their adjacent portions whereby to permit a lateral angling of one clamping member relatively to the other.

10. In a belt connecter, a pair of clamping members having tongues, a link arranged between said tongues, and a pintle assembly between each clamping member and the portion of the link adjacent thereto, each of said pintle assemblies being composed of relatively rocking pintle members disposed between the belt ends and having interengaging projections and depressions adapted to form a fulcrum between said clamping members and said link, the pintle projections being laterally extended beyond the pintle body to form end extensions thereof, the opposite pintle member having heads with cut-away portions adapted to permit the rocking motion of said end extensions therein.

11. In a belt connecter, a pair of clamping members having tongues, a link arranged between said tongues, and a pintle assembly between each clamping member and the portion of the link adjacent thereto, each of said pintle assemblies being disposed between the belt ends and being composed of relatively rocking pintle members, one of said pintle members having heads adapted to receive the body of the opposite pintle member therebetween, whereby to prevent end motion thereof.

12. In a belt connecter, a pair of clamping members having tongues, a link arranged between said tongues, and a pintle assembly between each clamping member and the portion of the link adjacent thereto, each of said pintle assemblies being disposed between the belt ends and being composed of relatively rocking pintle members, one of said pintle members having heads adapted to receive the body of the opposite pintle member therebetween, whereby to prevent end motion thereof, the outermost tongues being recessed to engage said pintle heads.

13. In a belt connecter, a pair of clamping members having tongues, a link arranged between said tongues, and a pintle assembly between each clamping member and the portion of the link adjacent thereto, each of said pintle assemblies being disposed between the ends of the belt and being composed of relatively rocking pintle members, one of said pintle members having heads adapted to receive the body of the opposite pintle member therebetween, whereby to prevent end motion thereof, the outermost tongues being recessed to engage said pintle heads, said link portion being recessed to receive one part of said opposite pintle member.

14. In a belt connecter, a pair of clamping members having tongues, a link arranged between said tongues, and a pintle assembly between each clamping member and the portion of the link adjacent thereto, each of said pintle assemblies being disposed between the ends of the belt and being composed of relatively rocking pintle members having interengaging projections and depressions adapted to form a fulcrum between said clamping members and said link, said link being recessed to receive one pintle member of each assembly, and said tongues being recessed to receive a part of the other pintle member of each assembly, one of said pintle members having heads arranged to receive the body of the other pintle member therebetween.

15. A pintle assembly for a belt connecter comprising a pintle member having a ridge with end extensions, another pintle member having a groove with end heads, said end heads being cut away to provide freedom of motion of said end extensions, said end extensions being cut away near the ends of said ridge.

16. A pintle assembly for a belt connecter comprising a pintle member having a ridge with end extensions, another pintle member having a groove with end heads, said end heads being cut away to provide freedom of motion of said end extensions, said end extensions being cut away near the ends of said ridge, said heads adjacent said cut-away portions forming wings adapted to receive the body of the other pintle member therebetween to prevent end motion thereof.

17. In a belt connecter, a pair of clamping members having tongues, a link arranged between said tongues, and a pintle assembly between each clamping member and the portion of the link adjacent thereto, one of said pintle members having a flat back, and said adjacent link portion having a rectangular recess arranged to receive said flat back, said pintle assemblies being disposed between the ends of the belt.

18. In a belt connecter, a pair of clamping members having tongues, a link arranged between said tongues, and a pintle assembly between each clamping member and the portion of the link adjacent thereto, one of said pintle members having projecting heads at each end thereof, and the adjacent tongues of said clamping members having recessed portions arranged to receive said heads, both of said pintle assemblies being disposed between the ends of the belt.

19. In a belt connecter, a pair of clamping members opposed to one another with a space between the forward portions thereof, a link arranged to interconnect said clamping members, and a bearing device between each clamping member and the adjacent end of said link whereby said clamping members are operatively interconnected without being interlaced, each of said bearing devices comprising a grooved member engaging a clamping member and cooperating with a ribbed member engaging the link to provide pivotal connection therebetween.

20. In a belt connecter, a pair of clamping members opposed to one another with a space between the forward portions thereof, a link arranged to interconnect said clamping members, and a bearing device between each clamping member and the adjacent end of said link whereby said clamping members are operatively interconnected without being interlaced, said link being of approximately rectangular form, and said clamping members having their forward portions approximately flat, said bearing device being arranged between the opposing flat portions of said clamping member and said link and disposed between the ends of the belt.

21. In a belt connecter, a pair of clamping members opposed to one another with a space between the forward portions thereof, a link arranged to interconnect said clamping members, and a bearing device between each clamping member and the adjacent end of said link whereby said clamping members are operatively interconnected without being interlaced, said link being of approximately rectangular form, and said clamping members having their forward portions approximately flat, said bearing device consisting of a pair of relatively rocking pintle members disposed between the ends of the belt and having flat backs, said flat backs engaging the opposing flat portions of said clamping member and said link respectively.

22. In a belt connecter, a pair of clamping members having tongues, a link arranged between said tongues, and a bearing device between each clamping member and the portion of the link adjacent thereto and disposed between the ends of the belt, the fulcrum of said bearing device being positioned substantially at the level of the neutral axis of the belt.

23. In a belt connecter, a pair of clamping members spaced longitudinally apart from one another, a link arranged between said clamping members, and a pintle assembly having relatively rocking pintle members between each clamping member and the portion of the link adjacent thereto and disposed between the ends of the belt, the point of rocking contact being arranged substantially opposite the neutral axis portion of the belt end adjacent thereto.

EDWARD H. KREMER.